United States Patent
Suryan

(10) Patent No.: US 11,291,201 B2
(45) Date of Patent: *Apr. 5, 2022

(54) SOLUTIONS FOR INCREASING THE STABILITY AND SHELF LIFE OF AN ORGAN AND TISSUE PRESERVATION SOLUTION

(71) Applicant: Marizyme, Inc., Jupiter, FL (US)

(72) Inventor: Mahendra Suryan, Wellington, FL (US)

(73) Assignee: Marizyme, Inc., Jupiter, FL (US)

( * ) Notice: Subject to any disclaimer, the term of this patent is extended or adjusted under 35 U.S.C. 154(b) by 626 days.

This patent is subject to a terminal disclaimer.

(21) Appl. No.: 14/906,582

(22) PCT Filed: Nov. 18, 2014

(86) PCT No.: PCT/US2014/066054
§ 371 (c)(1),
(2) Date: Jan. 21, 2016

(87) PCT Pub. No.: WO2015/077199
PCT Pub. Date: May 28, 2015

(65) Prior Publication Data
US 2016/0249603 A1    Sep. 1, 2016

Related U.S. Application Data

(60) Provisional application No. 61/963,093, filed on Nov. 22, 2013.

(51) Int. Cl.
*A01N 1/02* (2006.01)
(52) U.S. Cl.
CPC .......... *A01N 1/0226* (2013.01); *A01N 1/021* (2013.01)

(58) Field of Classification Search
None
See application file for complete search history.

(56) References Cited

U.S. PATENT DOCUMENTS

| | | |
|---|---|---|
| 4,443,432 A | 4/1984 | Garabedian et al. |
| 4,550,022 A | 10/1985 | Garabedian et al. |

(Continued)

FOREIGN PATENT DOCUMENTS

| | | |
|---|---|---|
| BY | 8118 | 6/2006 |
| GB | 2270614 | 11/1993 |

(Continued)

OTHER PUBLICATIONS

Hirano et al, Molecular Dynamics Simulation of the Arginine-Assisted Solubilization of Caffeic Acid: Intervention in the Interaction, 2013, J. Phys. Chem. B, 117(25): 7518-7527 (Year: 2013).*

(Continued)

*Primary Examiner* — Sharmila G Landau
*Assistant Examiner* — Stephanie A McNeil
(74) *Attorney, Agent, or Firm* — Dentons US LLP

(57) ABSTRACT

Organ and tissue preservation solutions having improved stability are disclosed. The solutions are comprised of two separate solutions. The first solution, Solution A, is comprised of a balanced salt solution that is stable in solution at a pH of 7.0 or above. A second solution, Solution B, is comprised of an aqueous solution containing L-glutathione and/or cysteinylglycine, a sugar such as D-glucose, L-Arginine, a reducing agent such as ascorbic acid and water at a pH of below 7.0, preferably from about 3.0 to 5.0. The two Solutions are then mixed together at the point of use and the pH adjusted to about 7.3 resulting in the organ and tissue preservation solution having improved stability. Preferably, solution A has a pH of about 7.6 and solution B has a pH of about 5.0. The present invention is also comprised of kits 20

(Continued)

that contain the two Solutions in two separate containers 22, 24. In an alternate embodiment, the sugar can be in Solution A.

9 Claims, 5 Drawing Sheets

(56) References Cited

U.S. PATENT DOCUMENTS

| | | | |
|---|---|---|---|
| 4,798,824 | A | 1/1989 | Belzer et al. |
| 4,837,021 | A | 6/1989 | Andermann et al. |
| 4,873,230 | A | 10/1989 | Belzer et al. |
| 4,879,283 | A | 11/1989 | Belzer et al. |
| 4,938,961 | A | 7/1990 | Collins et al. |
| 5,066,578 | A * | 11/1991 | Wikman-Coffelt ...... A01N 1/02 435/1.2 |
| 5,257,985 | A | 11/1993 | Puhl |
| 5,304,724 | A | 4/1994 | Newton |
| 5,409,904 | A | 4/1995 | Hecht et al. |
| 5,498,427 | A | 3/1996 | Menasche |
| 5,871,477 | A | 2/1999 | Isono et al. |
| 5,906,915 | A * | 5/1999 | Payrat .................. A01N 1/0226 435/2 |
| 6,153,582 | A | 11/2000 | Skeknik |
| 6,339,074 | B1 | 1/2002 | Cialdi et al. |
| 6,569,615 | B1 | 5/2003 | Thatte et al. |
| 7,611,830 | B2 | 11/2009 | Thatte et al. |
| 7,981,596 | B2 | 7/2011 | Thatte et al. |
| 8,211,628 | B2 | 7/2012 | Thatte et al. |
| 8,288,084 | B2 | 10/2012 | Lee |
| 8,608,922 | B2 | 12/2013 | Papadimitrakopoulos et al. |
| 8,945,823 | B2 | 2/2015 | Thatte et al. |
| 9,029,078 | B2 | 5/2015 | Young |
| 9,078,428 | B2 | 7/2015 | Hassanein et al. |
| 2005/0147958 | A1* | 7/2005 | Hassanein ............ A01N 1/021 435/1.1 |
| 2006/0093765 | A1 | 5/2006 | Muller |
| 2007/0098694 | A1 | 5/2007 | Khuri et al. |
| 2009/0035240 | A1* | 2/2009 | Maes .................... A61K 8/06 424/63 |
| 2010/0151435 | A1* | 6/2010 | Thatte .................. A01N 1/0226 435/1.1 |
| 2011/0059177 | A1 | 3/2011 | Thatte |
| 2012/0209320 | A1* | 8/2012 | Montenegro ........... A61L 15/28 606/213 |
| 2012/0264103 | A1 | 10/2012 | Thatte et al. |

FOREIGN PATENT DOCUMENTS

| | | |
|---|---|---|
| RU | 2387641 | 7/2006 |
| WO | 1992008349 A1 | 5/1992 |
| WO | 2008/100636 A2 | 8/2008 |
| WO | 2010/054495 | 5/2010 |
| WO | 2012/022787 A1 | 3/2012 |
| WO | 2014106083 A1 | 7/2014 |
| WO | 2014106091 A1 | 7/2014 |
| WO | 2014/176224 | 10/2014 |
| WO | 2014179113 A1 | 11/2014 |

OTHER PUBLICATIONS

Campbell et al, The Stability of Ascorbic Acid in Solution, 1950, Canadian Journal of Research, 28e(1): abstract only (Year: 1950).*

Thatte et al. (2003) "Multi-Photon Microscopic Evaluation of Saphenous Vein Endothelium and Its Preservation With a New Solution, GALA" Annal. Thoracic Surg. 75 (4): 1145-1152 DOI: 10.1016/S0003-4975(02)04705-7.

Touitou, E., et al. "Glutathione stabilizes ascorbic acid in aqueous solution." International journal of pharmaceutics 133.1-2 (1996): 85-88.

The Stability of Ascorbic Acid in Solution, Canadian Journal of Research, by James Campbell & W G Tubb, pubd Apr. 12, 2011 (1 page).

Relative Stability of Glucose and Fructose at Different Acid PH, Food Chemistry vol. 12, Issue 3, 1983 by R.S. Shallenberger and L.R. Mattick, 1983 (1 page).

Presumed and Actual Concentrations of Reduced Glitathione in Preservation Solutions, Transplantation Proceedings 43, 3451-3454 (2011) by A. Van Breussegem et al, 2011 (4 pages).

Thatte et al. "Multi-Photon Microscopic Evaluation of Saphenous Vein Endothelium and Its Preservation With a New Solution, GALA" Annal. Thoracic Surg. 75 (4): 1145-1152 DOI: 10.1016/S0003-4975(02)04705-7.

Yosuke Uchida Kohjin Co., Ltd. 1-21, Nihombashi-Muromachi 4 Chome Chou-ku, Tokyo, 103-0022. Japan. Re: GRAS Notice No. GRN 000293 dated Jan. 28, 2008.

Masayoshi Aruga et al, Kinetic Studies on Decomposition of Glutathione Ii. Anaerobic Decomposition in Aqueous Solution vol. 28 (1980), (7 pages).

G.B. Golubitskii et al Stability of Ascorbic Acid in Aqueous and Aqueous-Organic Solutions for Quantitative Determination ISSN 1061-9348 Journal of Analytical Chemistry 2007 vol. 62, No. 8 (6 pages).

Hemant S. Thatte, MSC, PhD et al Development & Evaluation of a Novel Solution, Somah, For The Procurement & Preservation of Beating and Nonbeating Donor Hearts for Transplantation © 2009 American Heart Assn (11 pages).

L-Glutathione Gras Notification submitted to Kohjin Co., Ltd. dated Feb. 12, 2008 (11 pages).

Eurasian Search Report from corresponding Eurasian Appln 201691066 dated Mar. 6, 2017 (3 pages).

* cited by examiner

SOLUTIONS FOR INCREASING THE STABILITY AND SHELF LIFE OF AN ORGAN AND TISSUE PRESERVATION SOLUTION

RELATED APPLICATIONS

This application is a submission under 35 USC § 371 of International Application No. PCT/US2014/066054, filed Nov. 18, 2014, which claims the benefit of and priority to prior filed U.S. Provisional Patent Application Ser. No. 61/963,093 filed Nov. 22, 2013, the disclosures of which are hereby incorporated herein by reference in their entirety.

FIELD OF THE INVENTION

The present invention is directed to formulations for preserving tissue and organ function and more particularly to shelf stable formulations for preserving tissue and organ function, in particular the function of vascular conduits, prior to implantation.

BACKGROUND OF THE INVENTION

The teachings of all the references cited herein are incorporated in their entirety by reference.

U.S. Pat. No. 7,981,596 discloses tissue and organ preservation solutions, generally called GALA. This is named after three components: glutathione, ascorbic acid and L-Arginine. GALA solutions also include a balanced salt solution. These solutions are especially useful for preserving vascular conduits such as arteries and veins. Vascular conduits are used as grafts for a variety of bypass surgical procedures including but not limited to peripheral vascular bypass surgery and coronary artery bypass grafting (CABG) surgery. Bypass grafting is a method in which a vascular conduit is grafted in such a way as to bypass an obstructed artery to restore blood flow to a target tissue. During vascular surgeries, vascular conduits are harvested, flushed and stored temporarily in a preservation solution prior to their grafting.

Endothelial dysfunction is the primary determinant in the interrelated pathogenesis leading to vascular conduit failure. Graft failure is preceded by graft thrombosis, intimal hyperplasia and accelerated graft atherosclerosis all of which are predicated upon previous functional and/structural impairment of the vascular conduit endothelium. It has been recognized that the choice of storage solution for intraoperatively harvested saphenous vein segments has a significant impact on endothelial structure and function and therefore graft patency. The inability of these solutions to adequately preserve the vascular conduit has been demonstrated by a number of investigators (Thatte H S, Biswas K S, Najjar S F, et al. Multi-photon microscopic evaluation of saphenous vein endothelium and its preservation with a new solution, GALA. Ann Thorac Surg 2003; 75: 1145-52 and Hussaini 2011). In a 2011 ex vivo study by Wilbring et al demonstrated that vascular function was completely abolished after conduits harvested from patients were stored in a buffered saline solution, commonly used for vascular conduit storage. The data revealed that endothelial cell function was also significantly reduced yet these dysfunctional conduits were successfully used as grafts for bypass surgery in this study.

The effect of GALA™ preservation solution on human saphenous vein segments was evaluated in ex vivo studies. While solutions in clinical use today led to a profound decline in endothelial cell viability of vascular conduits (saphenous vein), GALA™ maintained endothelial function and structural viability for at least up to 24 hours (Thatte 2003, Circulation 2013:127 e6-e245 Hussaini B E, Lu X G, Wolfe J A and Thatte S. Evaluation of endoscopic vein extraction on structural and functional viability of saphenous vein endothelium. J Cariothorac Surg 2011; 6:82-90). The ex vivo data thus demonstrated that better preservation of vascular conduits could be afforded through the use of GALA™ as a vascular conduit preservation solution. However, the disclosed solution has a limited shelf life due to instability of the Solution.

Thus, there is a need to produce improved Solutions of the GALA organ and tissue preservation solutions to improve the stability and shelf life of the Solution.

SUMMARY OF THE INVENTION

The present invention is premised on realization that stability the GALA formulation, can be improved by separating the formulation into a first Solution A having a pH of at least 7, generally 7.4-8 and a Solution B having a pH of less than 7, generally lower. Solution A includes a balanced salt solution. Solution B includes water, an antioxidant such as ascorbic acid, a reducing agent, in particular L-glutathione, a nitric oxide substrate such as L-Arginine and a sugar, such as D-glucose. This solution is maintained at a pH below 7, preferably 5, 4 or 3, and preferably with an oxygen content at zero parts per million. In an alternate embodiment of the present invention, Solutions A and B are formulated as stated above, with the exception that the sugar is added to Solution A and not in Solution B. Also, in an alternative formulation erythropoietin (EPO) can be added, preferably to Solution B.

DETAILED DESCRIPTION

Figure 1:
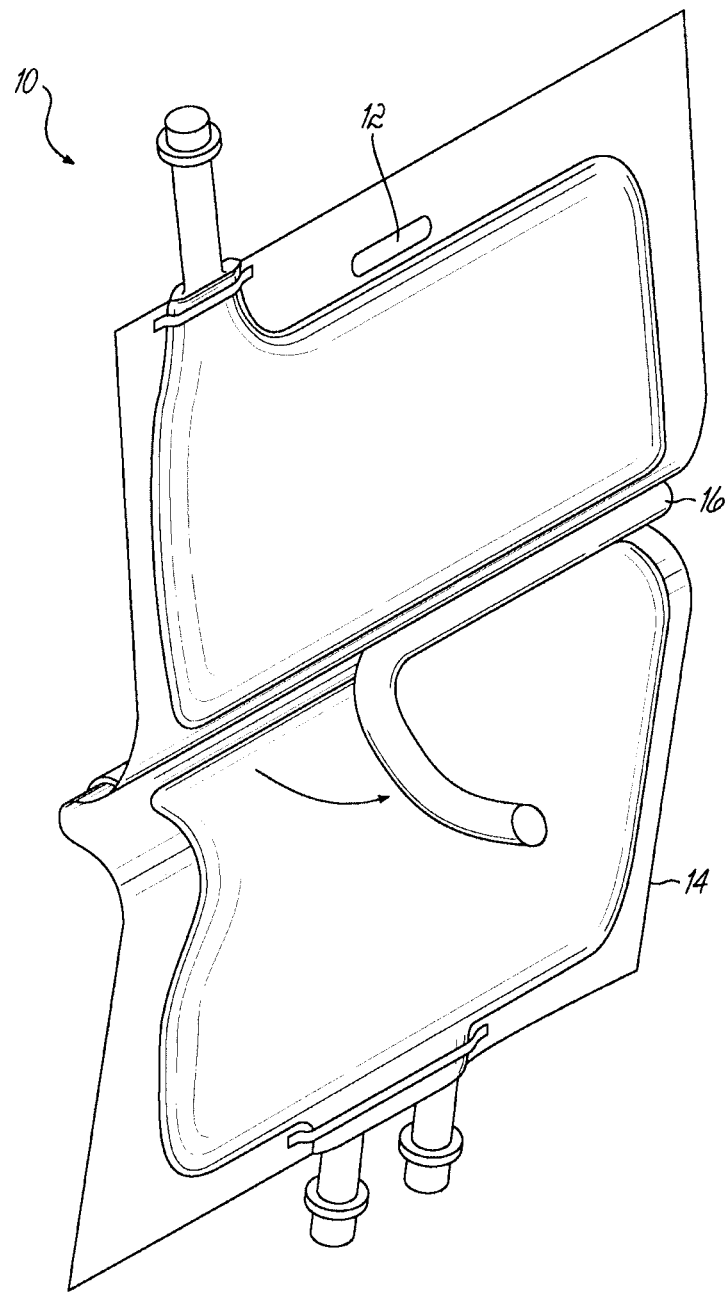
FIG. 1 is a perspective view of a multi-chamber bag for use in the present invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described. For purposes of the present invention, the following terms are defined below.

As used herein, the term "patient" includes members of the animal kingdom including but not limited to human beings.

As employed herein, "organ" includes, but is not limited to, the heart, veins, arteries, lungs, liver, pancreas and the kidneys. Portions of organs are also contemplated.

As used herein, "sterile water" includes, but is not limited to, (a) sterile water for injection, USP, (b) sterile distilled deionized water, and (c) sterile water for irrigation.

As used herein, "cardioplegia" includes, but is not limited to, paralysis of the heart.

As used herein, "moderate hypotheimia" is about 10.degree.-21.degree. C.

As used herein, an "antioxidant" is a substance that, when present in a mixture or structure containing an oxidizable substrate biological molecule, delays or prevents oxidation of the substrate biological molecule. For example, ascorbic acid is an antioxidant.

"Balanced salt solution" is defined as an aqueous solution that is osmotically balanced to prevent acute cell or tissue damage.

"Buffered salt solution" is defined as a balanced salt solution to which chemicals have been added to maintain a predetermined physiological pH range.

"GALA" refers to a type of tissue preservation solution including glutathione, ascorbic acid, L-Arginine and a balanced salt solution.

"Graft" is defined as tissue that is transplanted or implanted in a part of the body to repair a defect.

"Harvested bypass conduit" is defined as a surgically installed alternate route for the blood to bypass an obstruction.

"Solution of cardioplegia" is defined as a solution that aids in the preservation of the heart during transport or surgery.

"Cellular reducing agent" is defined as a substance that loses electrons easily thereby causing other substances to be reduced chemically.

A "buffering agent" is an acid or base used to maintain the acidity (pH) of a solution near a chosen value. Preferred buffering agents used to produce the solutions of the present invention are 4N HCl and 84% $NaHCO_3$.

An isotonic solution refers to two solutions having the same osmotic pressure across a semipermeable membrane. An isotonic solution is a solution that has the same salt concentration as cells.

Physiologic solution is defined as an aqueous salt solution which is compatible with normal tissue, by virtue of being isotonic with normal interstitial fluid.

The present invention provides a GALA-type tissue preservation formulation comprised of two solutions, Solution A and Solution B having unexpectedly higher stability than prior single-solution tissue preservation solutions of the GALA type.

According to the present invention, the first solution, or Solution A is comprised of a balanced salt solution. The balanced salt solution is comprised of water and physiologically acceptable salts. A typical balanced salt solution will be comprised of water, calcium ions, chloride ions, potassium ions, phosphate ions, magnesium ions and sodium ions.

The balanced salt solution includes salts selected from the following: calcium chloride dihydrate, potassium chloride, potassium phosphate monobasic, magnesium chloride hexahydrate, magnesium sulfate heptahydrate, sodium chloride, sodium bicarbonate, sodium phosphate dibasic heptahydrate and combinations thereof. The balanced salt solution is provided at a concentration that will result in an isotonic solution when the first and second solutions are mixed together. In an exemplary embodiment, the balanced salt solution includes about 0.14 grams/liter calcium chloride dihydrate, about 0.4 grams/liter potassium chloride, 0.06 grams/liter potassium phosphate monobasic, about 0.1 grams/liter magnesium chloride hexahydrate, about 0.1 grams/liter magnesium sulfate heptahydrate, about 8 grams/liter sodium chloride, about 0.36 grams/liter sodium bicarbonate, and about 0.03 grams/liter sodium phosphate dibasic heptahydrate.

The components of Solution A are dissolved together in water and the pH of the resultant solution is adjusted to about 7.4-8.0 by the addition of a base, such as sodium bicarbonate.

Optionally, Solution A can contain non-steroidal anti-inflammatory agents such as aspirin, naproxen and ibuprofen. Optionally, local anesthesia medications may be added, preferably in Solution A or, in the alternative, the anesthesia medication can be added at the point of use. Examples of such local anesthesia medications include but are not limited to lidocaine, articaine/epinephrine, mepivacaine, bupivacaine, ropicavaine and chloroprocaine.

According to the present invention, the following components of GALA will be in a second solution, or Solution B: reduced Glutathione, a reducing agent such as ascorbic acid; a sugar such as D-Glucose, L-Arginine, a buffering agent, and water which has been purged with an inert gas, such as argon, to remove substantially all dissolved oxygen (preferably to less than 0.1 ppm). The pH of resultant Solution B is less than 7 and generally from 3 to 5. As an alternative, cysteinylglycine can be substituted for reduced Glutathione or a mixture of cysteinylglycine and reduced Glutathione can be present in Solution B. In a most preferred formulation, the pH of Solution A is 8.0 and the pH of Solution B is about 3.0.

More specifically, Solution B is a solution of organic components in a separate container from Solution A and comprised of L-glutathione, L-Arginine, L-ascorbic acid, D-glucose and $H_2O$ for injection at a pH of 3.0-5.0. Other sugars that can be used in place of glucose are any sugar but preferably any monosaccharide including but not limited to fructose, mannose and ribose. When Solutions A and B are mixed at the point of use, the pH of the mixed solution is 7.3±0.4. The pH of the Solutions A and B can be adjusted using many known buffering agents. Preferred buffering agents are 4N HCl and 84% $NaHCO_3$. In a preferred formulation, the pH of Solution A is about 7.8 and the pH of Solution B is about 4.0. In a most preferred formulation, the pH of Solution A is 8.0 and the pH of solution B is 3.0.

The salts in the solution are intended for buffering (maintain pH) and to maintain isotonicity with respect to vascular conduits. The organic components are intended to maintain additional buffering capability, osmolality and to provide a non-oxidizing environment to vascular conduits. The four organic components; L-glutathione, L-ascorbic acid, L-Arginine and D-glucose, are normal constituents of blood and are included for their roles in preserving and maintaining the extracellular environment of vascular conduits.

L-Glutathione and L-ascorbic acid are antioxidants that prevent oxidative damage to cells by soaking up free radicals. The function of these antioxidants in the tissue preservation solution is, 1) to stabilize other components of the solution by preventing oxidation, thereby improving the stability and shelf life of product and 2) to prevent oxidative damage to cell membranes and extracellular matrix structures. Oxidative damage has been shown to break the structural integrity of the extracellular architecture, thus causing interrupted endothelial cell lining. Interrupted endothelial lining is an indicator of damaged vascular graft. The sugar is intended to provide an energy source for the tissue or organ.

When Solution A is combined with Solution B, the concentration of L-arginine should be from about 250 µM to about 2000 µM. The concentration of glucose should be about 50 mM to about 120 mM, L-glutathione 50 µM to about 2000 µM, and L-ascorbic acid 25 µM to about 1000 µM, The first or second formulations may optionally include an anticoagulant in an amount sufficient to help prevent clotting of blood within the vasculature of a tissue or organ. Exemplary anticoagulants include heparin and hirudin, but other anticoagulants such as aspirin may be used. An exemplary embodiment includes heparin in concentration ranges from about 50 units/mL to about 250 units/mL. Heparin can also be added separately after Solutions A and B have been combined and prior to use.

In an exemplary embodiment, the volumetric ratio between Solution A and Solution B is about 19:1. For example in one embodiment, 950 ml of Solution A is mixed with 50 ml of Solution B to result in the final formulation for preserving the function of a tissue or organ.

If EPO is added to either Solution A or B, the concentration of EPO should be about 5 units/mL when Solution A and Solution B are combined.

According to the present invention, a second alternative tissue preservation solution includes a solution A, which includes a sugar such as glucose, mannose, fructose or the like, in combination with a balanced salt solution at a pH of 7.4 to 8 and a second solution, Solution B, comprises reduced glutathione, ascorbic acid, L-Arginine, a buffering agent in water at a pH below 7, generally 5, 4 or 3, which may be stored in an oxygen-free environment.

Generally, neither Solution A or B in either embodiment will include other organic components other than those specifically listed, as these would be unnecessary and increase production costs. In particular, organic compounds other than those previously listed which are found in other types of tissue preservation solutions, would not be included in Solutions A or B, to minimize cost and reduce potential side reactions, which could be detrimental to the final product.

The manufacturing process is robust, and is carried out under cGMP conditions. The product is sterilized by aseptic filling procedures and stability testing provides a proposed shelf life of at least 2 years.

Figure 2:
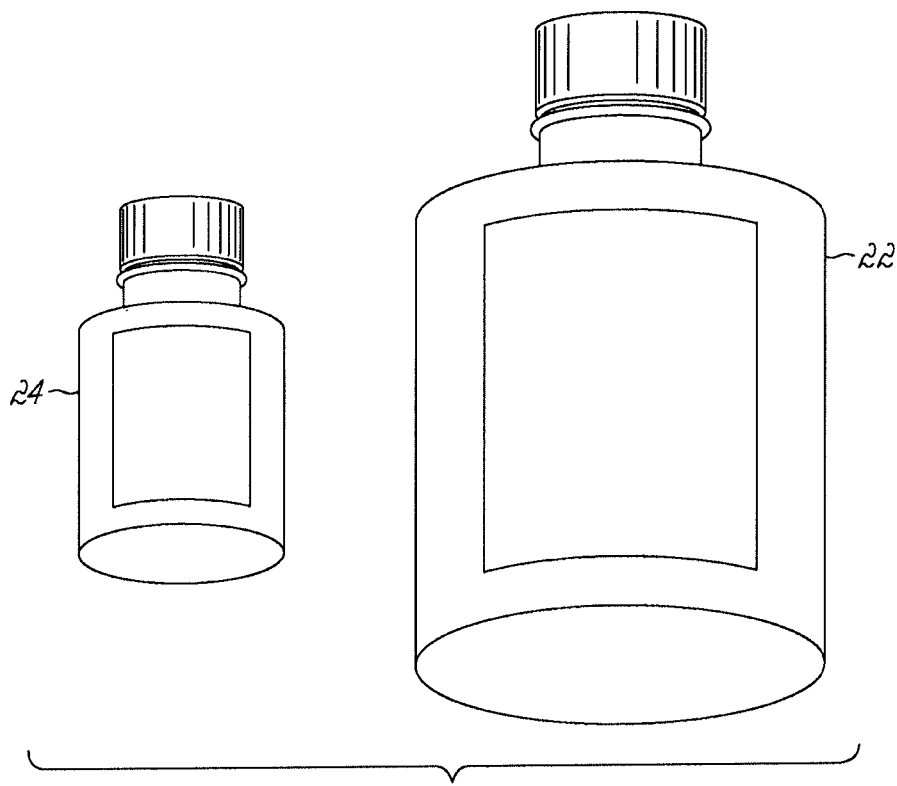
FIG. 2 is a perspective view of a kit having a first and a second container for use with the present invention.

FIG. 1 and FIG. 2 show exemplary embodiments of kits or containers used to ship, store and finally use the tissue preservation solutions of the present invention. These are exemplary and other containers can be used to provide separate Solutions A and B which are combined at the point of use for tissue preservation.

FIG. 1 shows a bag 10 having two chambers 12 and 14 that are partitioned or clamped off from each other by clamp 16. Chamber 12 contains Solution A and chamber 14 contains Solution B. When clamp 16 is removed, chambers 12 and 14 become one chamber of bag 10 and Solution A mixes with Solution B resulting in the complete organ and tissue preservation solution in bag 10. See U.S. Pat. No. 5,257,985.

FIG. 2 shows an organ and tissue preservation kit 20 having two containers 22 and 24. Solution A is contained in container 22 and Solution B is contained in container 24. At the point of use, the contents of container 24 can be emptied into container 22 or the contents of both container 22 and container 24 can be both emptied into a basin or bowel into which an artery or vein can be placed to produce the complete organ and tissue preservation solution.

In a preferred embodiment as shown in FIG. 2, Solution A is aseptically filled in a pre-sterilized Nalgene bottle, which is then secured with a pre-sterilized HDPE screw cap.

Solution B is aseptically filled in a pre-sterilized borosilicate, Type I, glass vial, which is secured with a pre-sterilized Stelmi septum, which is held in place with a tear-off seal. The tear-off seal is crimped to the bottle using a validated crimping process at the manufacturer's recommended crimp setting. Bottle B may be de-gassed with Argon gas during the mixing and filling process to reduce the presence of oxygen but this may not be necessary.

The bottle containing solution A and the bottle containing solution B are then placed in a card-stock preprinted box. The package insert is also placed in the box at this time. The box is then sealed and labeled for distribution.

At the point of use Solutions A & B are mixed together to complete the final Solution C of GALA and the pH will be adjusted to about 7.3±0.4. If the pH of Solution A is 8.0 the pH of Solution B will be about 3.0. If the pH of Solution A is 7.8 the pH of Solution B will be about 4.0. And, if the pH of Solution A is 7.6 the pH of Solution B will be about 5.0.

The following is a recommended procedure for practicing the present invention.

Figure 5A:
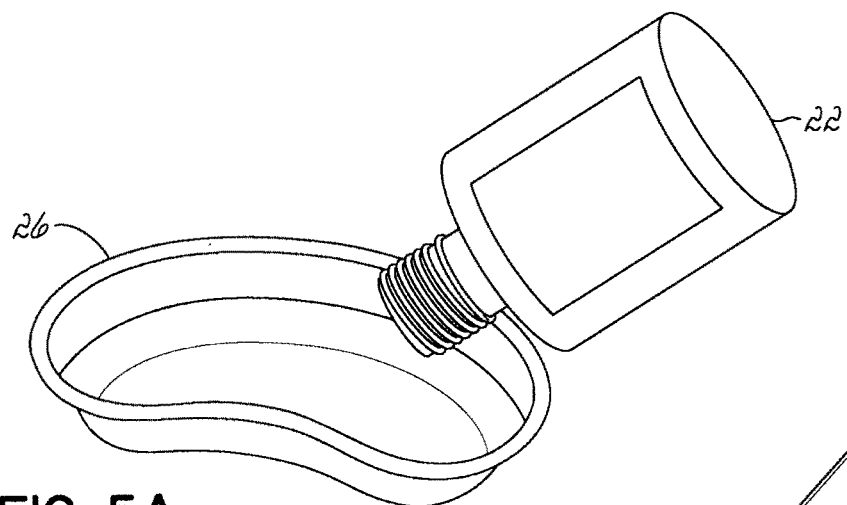
FIGS. 5A-5D are diagrammatic depictions of the method of practicing the present invention.
Figure 5B:
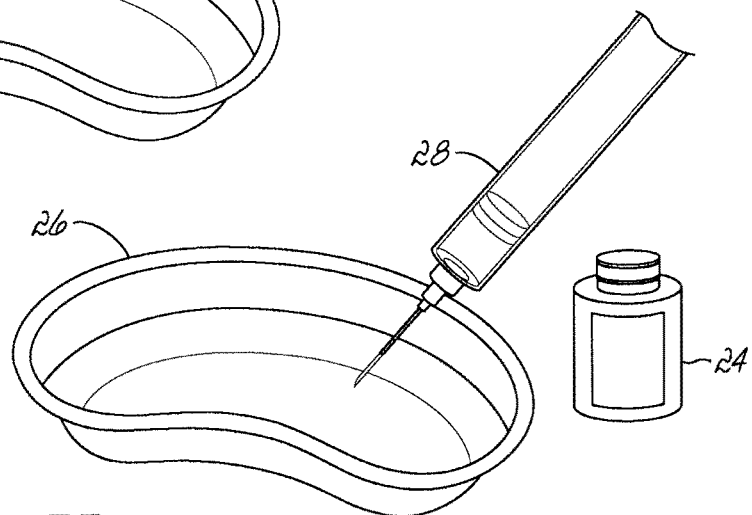
Figure 5C:
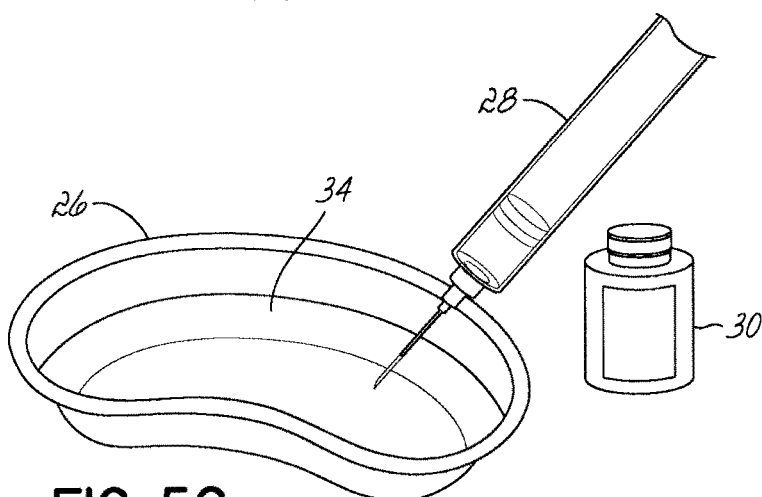
Figure 5D:
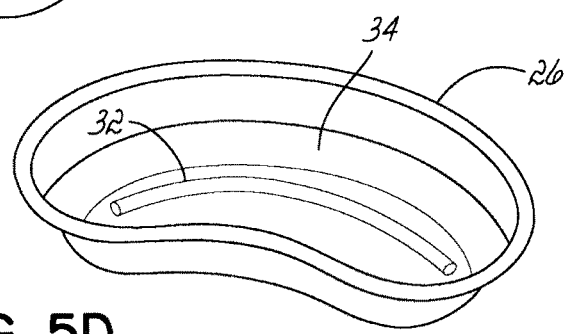

Allow the solutions 22 and 24 to warm to ambient or room temperature. Prior to use, check each container 22 and 24 for leaks by inspecting the closures. If a leak is found, discard solution container. Perform a visual inspection of the solution for particulate matter. Do not use the solution if obvious particulate matter, precipitates, or contamination are evident in the solution. Immediately prior to use, perform the following steps:

1. Pour the entire content of Solution A from vial 22 into a sterile container 26 (e.g. tray, cup or small basin) where the vascular conduit 32 will be stored prior to grafting, as shown in FIG. 5A.
2. With a sterile syringe 28 aseptically remove 12.5 ml of Solution B from vial 24 and add it to the container 26 with solution A (FIG. 5B) to form the GALA solution 34.
3. Add 12,500 units of heparin to the container 26 containing Solutions A and B as shown in FIG. 5C.
4. Mix by gently swirling in the container 26.

The solution is used to flush the isolated vascular conduit 32 immediately after removal from the patient. The combined solutions A and B may also be used in combination with a syringe to apply a hydrostatic pressure to the conduit to assess for conduit leakage prior to storage in the solution. The vascular conduit 32 is then stored in the combined solution 34 in container 26 until the vascular conduit can be grafted into the patient.

The solutions, devices, and perfusion methods of the present invention are not limited to use with a particular tissue, organ or cell type. For example, the invention may be used with harvested saphenous veins, epigastric arteries, gastroepiploic arteries and radial arteries used in coronary bypass grafting (CABG). The present invention may also be used to maintain organs and tissue during transplant operations. The present invention is not limited to any particular tissue or organ. For example, it is contemplated that such organs or tissues may be heart, lungs, kidney, brain, blood, platelets, muscle grafts, skin, intestine, bone, appendages, eyes, etc or portions thereof. Additionally, the present invention may be used as an in situ tissue or organ preservative. It is contemplated that the solution of the present invention be used to wash and bath tissues and organs that have not been removed from the patient. For example, it is contemplated that the present invention be used during cardioplegia. It is also contemplated that the present invention be used in, for example, emergency procedures where a tissue or organ may need to be bathed to preserve it until surgery or other medical attention can be obtained. In this regard, the solution may be made available to emergency medical personnel both in hospital settings and "in the field" (i.e., in ambulances or in temporary emergency medical facilities).

The GALA solution (Solutions A and B combined) can also be used as a lavage-solution in surgeries, in particular plastic or reconstructive surgery. This includes but is not limited to liposuction, breast reconstruction, mastectomy or other operations in which an isotonic, pH-balanced solution such as GALA would be desirable. The GALA solution can also be used to flush or prime a dialysis machine using the manufacturer's procedure for priming or flushing. The GALA solution can also be used in conjunction with a venous external support. An example of such a support is the Vest™ vascular external support being developed by Vascular Graft Solutions of Tel-Aviv, Israel.

The components of the organ and tissue preservation solutions can also be incorporated into gels, creams, or hydrogels. Examples of hydrogels are disclosed in U.S. Pat. No. 6,339,074.

Table 1 below shows an embodiment of the present invention in which the pH of the Solution A is about 8.0 and the pH of Solution B is about 3.0.

TABLE 1

Qualitative & Quantitative Composition of Solutions A and B of One Embodiment

| Components | *Concentration (±5%) | | |
|---|---|---|---|
| SOLUTION A | g/L | g/237.5 mL | mM |
| Calcium chloride dihydrate | 0.147 | 0.035 | 1.326 |
| Potassium chloride | 0.421 | 0.100 | 5.653 |
| Potassium phosphate monobasic | 0.063 | 0.015 | 0.463 |
| Magnesium sulfate heptahydrate | 0.105 | 0.025 | 0.432 |
| Magnesium chloride hexahydrate | 0.105 | 0.025 | 0.516 |
| Sodium chloride | 8.421 | 2.000 | 144.100 |
| Sodium bicarbonate | 0.379 | 0.090 | 4.390 |
| Sodium phosphate dibasic anhydrous | 0.028 | 0.007 | 0.200 |
| Water for injection | q.s. to 1 L | q.s. to 237.5 mL | — |
| Sodium bicarbonate 1.0M/HCl 1.0M | | Adjust pH to 8.0 | |

| Components | *Concentration (±5%) | | |
|---|---|---|---|
| SOLUTION B | g/L | g/12.5 mL | mM |
| L-Glutathione | 6.200 | 0.078 | 20.200 |
| D-Glucose | 20.000 | 0.25 | 111.000 |
| L-Arginine | 3.000 | 0.038 | 17.200 |
| L-Ascorbic acid | 1.800 | 0.023 | 10.200 |
| Water for injection | q.s. to 1 L | q.s. to 12.5 mL | — |
| Sodium bicarbonate 1.0M/HCl 1.0M | | Adjust pH to 3.0 | |

The components of combined Solution A and Solution B are shown in Table 2:

TABLE 2

Qualitative and Quantitative Composition of the combined Solutions A & B

| Components | *Concentration (±5%) | | |
|---|---|---|---|
| SOLUTIONS A + B | g/L | g/250 mL | mM |
| Calcium chloride dihydrate | 0.14 | 0.0348 | 1.26 |
| Potassium chloride | 0.40 | 0.0998 | 5.37 |

TABLE 2-continued

Qualitative and Quantitative Composition of the combined Solutions A & B

| Components | *Concentration (±5%) | | |
|---|---|---|---|
| SOLUTIONS A + B | g/L | g/250 mL | mM |
| Potassium phosphate monobasic | 0.06 | 0.0148 | 0.44 |
| Magnesium sulfate heptahydrate | 0.10 | 0.0248 | 0.41 |
| Magnesium chloride hexahydrate | 0.10 | 0.0248 | 0.49 |
| Sodium chloride | 8.00 | 1.9998 | 136.89 |
| Sodium bicarbonate | 0.36 | 0.0900 | 4.17 |
| Sodium phosphate dibasic anhydrous | 0.026 | 0.0065 | 0.187 |
| L-Glutathione | 0.31 | 0.0775 | 1.01 |
| D-Glucose | 1.00 | 0.2500 | 5.55 |
| L-Arginine | 0.15 | 0.0375 | 0.86 |
| L-Ascorbic acid | 0.09 | 0.0225 | 0.51 |
| pH range after mixing A and B | | 7.3 ± 0.4 | |

The following examples are meant to illustrate the invention, but not limit it in any way.

Example 1

Multiple lots of Solution A and Solution B from Table 1 were produced. Twenty-one sets of Solution A and B containers from three separate lots were placed in a qualified stability chamber maintained at 40° C. with 75% relative humidity. Solution containers from each of the lots were periodically taken and tested under these accelerated conditions. The results of this data were extrapolated to determine the shelf life of the product, had it been stored at 2-8° C. Shelf life determination was based on assessment of the minimum duration of time that the product solutions remained within set specifications. The pH, osmolality and conductivity of the solutions A and B were studied. The eight inorganic salts that constitute Solution A are inert and remain stable in aqueous media for extended periods of time.

Two of the components of solution B, L-Arginine and D-glucose, were also found to be stable for extended periods of time at pH of 3. Therefore with all of the remaining specifications meeting the acceptance criteria, the two components that influenced the final outcome of the shelf life of the product were L-ascorbic acid and L-glutathione due to their antioxidant properties.

The rationale for the overall stability limiting property was for the solution to maintain conditions necessary for an overall reducing environment. When the solutions ceased to offer this benefit, it would fall out of specification. A reducing environment was achieved as long as some reduced L-glutathione and L-ascorbic acid, however small, remained in their reduced states in redox, equilibrium and solution. In other words, as long as L-glutathione and L-ascorbic acid each remained above detectable limits of the analytical method.

Figure 3A:
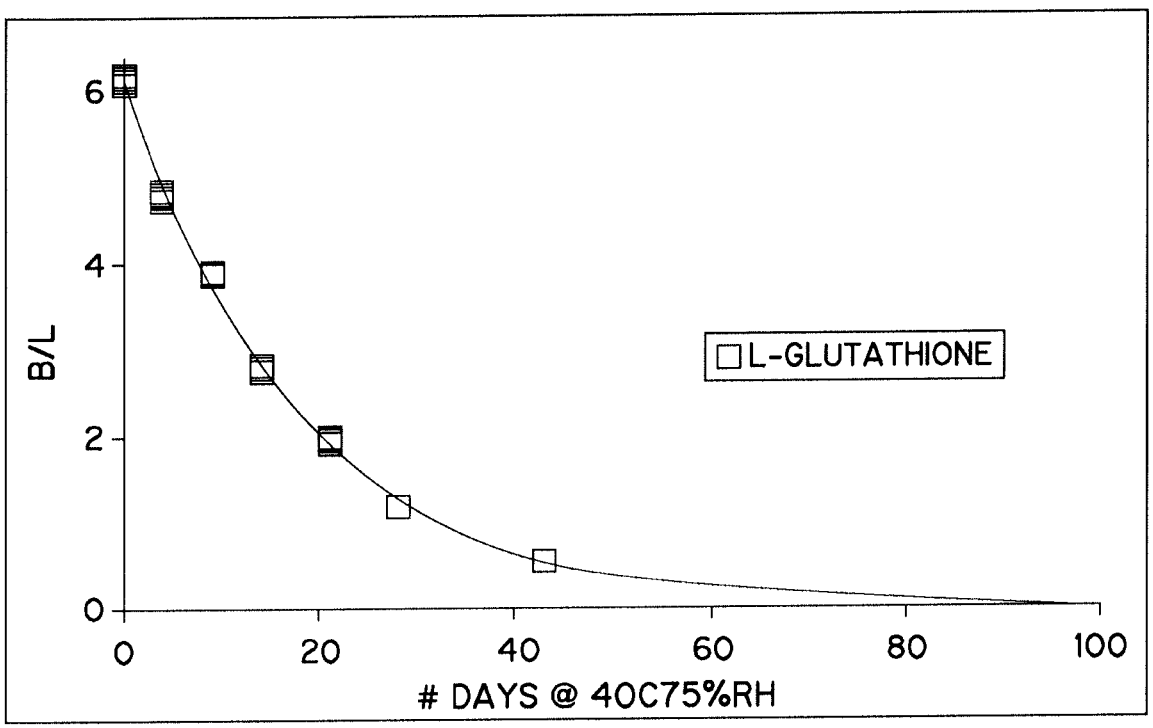
FIGS. 3A and 3B are graphs representing the concentration over time at accelerated storage conditions of glutathione, ascorbic acid and Arginine.
Figure 3B:
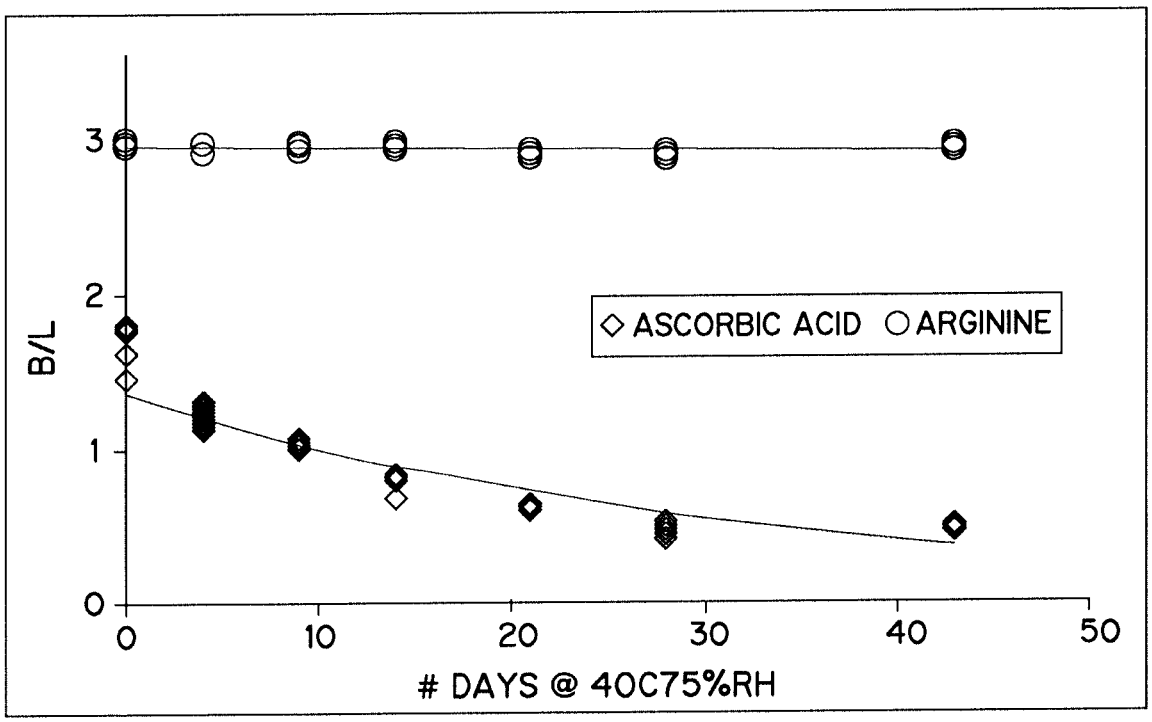

The data obtained while storing the solution at 40° C. was extrapolated to the average 5° storage temperature of such solutions using a Q10 factor of 2. Based on this extrapolation, it is predicted that the storage stability of Solution B is about 900 days, providing a shelf life of at least two years, far exceeding the requirements in the industry and far exceeding the stability of the current formulations. The raw data obtained showing concentration of glutathione is shown in FIG. 3A and the concentration over time for ascorbic acid and Arginine are shown in FIG. 3B.

Example 2

According to the Q10 Rule, the relationships between rate constant, temperature, and shelf life may be expressed as:

$$Q10 = \left(\frac{k2}{k1}\right)^{\frac{10}{T2-T1}} \text{ or } \frac{k2}{k1} = Q10^{\frac{T2-T1}{10}} \text{ or } \frac{SL1}{SL2} = Q10^{\frac{T2-T1}{10}}$$

Where k1 and k2 are the rate constants at temperatures T1 and T2 with shelf lives SL1 and SL2. The value of the temperature coefficient Q10, is dependent on the energy of activation Ea for the reaction. Therefore Q10 may be calculated using the above equation if the rate constants are known for at least two different temperatures. Values of Q10 are typically 2, 3, or 4 depending on whether the desired estimates of shelf lives are a) conservative, b) probable and reasonable, or c) less conservative but possible, respectively. As a rule of thumb a Q10 of 2 corresponds to Ea of 12.2 kcal/mol, 3 for 19.4 kcal/mol, and 4 for 24.5 kcal/mol.

During the early stages of regulatory submission of the product, when a detailed temperature-dependent kinetic data may not yet be available, a conservative estimate of shelf life must be made. A low activation energy for the degradation reaction is therefore assumed with a Q10 value of 2 for determining a conservative estimate of the product shelf life. According to this Rule the reaction rate would roughly double for every 10 degree rise in storage temperatures assuming a "most probable activation energy" for the reaction.

The first order rate constant for the decomposition of L-glutathione in Solution B at 40° C. was determined to be 0.0643 days$^{-1}$ from accelerated studies of two Lots of Solution B—one with Argon in the headspace and the other without. These profiles are shown together in FIG. 4. The first order exponential decay is shown in the lower plot, and the corresponding linear logarithmic plot is shown in the top plot. In addition, at this temperature (40° C.) the product specification for L-glutathione approached its limit of expiration in approximately 73 days. Using the arguments in the equation above, a conservative estimate of the shelf life at 5° C. storage can be estimated by extrapolation using a Q10 value of 2 as follows:

$$\text{Shelf Life@5° C.} = 73 * 2^{\frac{(40-5)}{10}} = 73 * 2^{3.5} \approx 800 \text{ days} \approx 27 \text{ months}$$

From this calculation therefore it can be inferred that at the very minimum the shelf life of Solution B would be predicted to be 27 months when the product is stored at 5° C.

Detailed real time studies on the stability of three GMP Lots of Solution B at 2-8° C. after fifteen months of data collected, however, suggests that the 27-month shelf life estimate from accelerated studies might be extremely conservative and the actual Q10 factor is 2.94.

The real time stability studies at 5° C. have progressed for about one year thus far. The available 12-15 month kinetic data of L-glutathione degradation from these Lots may be fitted to a first order reaction kinetics with a rate constant of about 1.40×10$^{-3}$ days$^{-1}$. At these rates, the product specification for L-glutathione approached its limit of expiration in about 100 months. Surprisingly, the shelf life determined on the basis of the 40° C. accelerated studies using Q10 extrapolation technique was significantly shorter (27 months) than what is suggested by the actual real time data. This discrepancy may be rationalized on the basis of the assumptions made during the Q10 extrapolation as described below.

Figure 4:
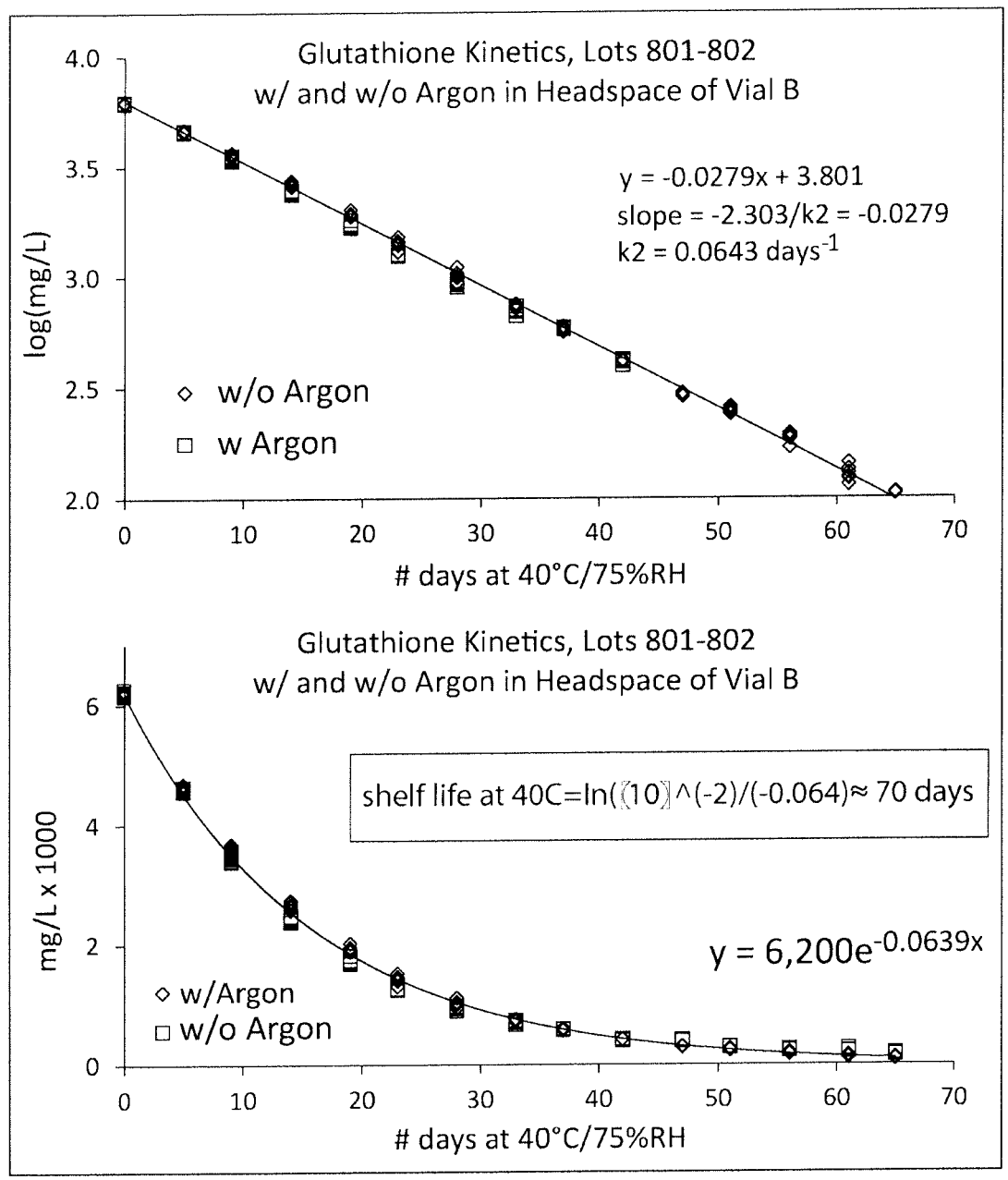
FIG. 4 are two graphs depicting the degradation rate of L-glutathione in Solution B.

The observed rates for the degradation of L-glutathione in Solution B of Solution B under accelerated conditions of 40° C./75% RH over a 65-day period is shown in FIG. 4. Similar trends have been observed for several other Lots of Solution B. In all instances the rate of this reaction is purely exponential in character (first order) implying that equal elapsed time gives equal fractional decrease in analyte concentration, in this case the concentration of L-glutathione, over the time range studied. The rate constants at both 40° C. and 5° C. of all eleven Lots studied are summarized in Table 3. The values of the exponents in the equation derived from the exponential fit are the first order rate constant k1 (in units of days$^{-1}$). These values are also presented in Table 3 at each of the temperatures studied.

This empirically derived value of 2.94 for the temperature coefficient Q10 is higher than the value of 2 used in previous calculations of shelf life. A value of Q10=2 represents a very conservative estimation of the shelf life resulting from a relatively low energy of activation of 12 kcal/mmol. A higher activation energy of 19 kcal/mmol with a value of Q10=2.94 on the other hand means that the reaction rate would roughly triple for every 10 degree rise in storage temperature with a corresponding inverse relationship to the shelf life.

With the revised Q10 value of 2.94 which is more representative of the true energy of activation of 19.0 kcal/mol for L-glutathione decomposition, the shelf life of Solution B can be recalculated by either extrapolating the 40° C. shelf life data and/or directly from the exponential fit of the one-year real time data at 5° C. The revised values are tabulated in Table 3.

The disparity in the results derived by the two approaches is illustrated in the comparison of the shelf lives at various temperatures between 5° C. and 60° C. by extrapolation the 40° C. empirical data using Q10 values 2 (conservative) and 2.94 (empirical). The results are shown in Table 4.

TABLE 3

Rate Constants & Shelf Life from Stability Studies

| # | Solution B head space | [GSH] g/L | k1, days$^{-1}$ | Temperature ° C. | Shelf Life, days at 5° C.* | at 20 C.* | Actual** |
|---|---|---|---|---|---|---|---|
| 1 | w/Argon | 6.2 | 0.00143 | 5 | 3220 | 639 | 3220 |
| 2 | w/Argon | 6.4 | 0.00143 | 5 | 3220 | 639 | 3220 |
| 3 | w/Argon | 6.4 | 0.00140 | 5 | 3290 | 653 | 3290 |
| 4 | wo/Argon | 6.2 | 0.05937 | 40 | 3390 | 631 | 73 |
| 5 | wo/Argon | 6.2 | 0.06465 | 40 | 3100 | 622 | 72 |
| 6 | wo/Argon | 6.2 | 0.06465 | 40 | 3100 | 622 | 72 |
| 7 | w/Argon | 6.2 | 0.06378 | 40 | 3130 | 622 | 72 |
| 8 | w/Argon | 6.2 | 0.06465 | 40 | 3100 | 622 | 72 |

TABLE 3-continued

Rate Constants & Shelf Life from Stability Studies

| # | Solution B head space | [GSH] g/L | k1, days$^{-1}$ | Temperature ° C. | Shelf Life, days at 5° C.* | at 20 C.* | Actual** |
|---|---|---|---|---|---|---|---|
| 9 | w/Argon | 6.2 | 0.06465 | 40 | 3100 | 631 | 73 |
| 10 | w/Argon | 6.2 | 0.05780 | 40 | 3400 | 691 | 80 |
| 11 | w/Argon | 6.2 | 0.05608 | 40 | 3400 | 709 | 82 |

*extrapolated 40° C. to 5° C. and 20 C. using Q10 Rule with a Q10 value of 2.94
**Actual accelerated and real time data curve approaching 1% [GSH]

TABLE 4

Extrapolated shelf lives of Solution B based on the old (conservative) and the new (empirical) Q10 values

| Storage Temperature, ° C. | Extrapolated Shelf Life, Days | |
|---|---|---|
| | Q10 = 2 | Q10 = 2.94 |
| 5 | 830 | 3300 |
| 20 | 290 | 640 |
| 25 | 200 | 367 |
| 40 | 73 | 73 |
| 50 | 35 | 23 |
| 60 | 18 | 7 |

Thus, shelf life is significantly improved by separating the components of the GALA solution into a higher pH balanced salt solution, which optionally may include glucose, and storing the organic components, particularly the L-arginine ascorbic acid and glutathione plus optionally a sugar at much lower pH. It has been unexpectedly discovered that increasing the stability of reduced glutathione also increases the stability of ascorbic acid and L-Arginine. The storage stability of the two solutions far exceeds commercial expectations or needs, making this formulation much more practical and suitable for a wide variety of different environments. This provides an end result of improved graft performance, improving cell viability of the graft material.

This has been a description the present invention along with the preferred method of practicing present invention. However, the invention itself should only be defined by the appended claims.

What is claimed is:

1. An organ and tissue preservation kit, comprising:
   a first precursor aqueous solution contained in a first container, and
   a second precursor solution contained in a second container;
   wherein the first precursor aqueous solution comprises a balanced salt solution, has a pH of about 7.4 to 8.0, and does not include reduced glutathione, ascorbic acid, or LArginine;
   wherein the second precursor solution comprises water, reduced glutathione, ascorbic acid, a sugar, L-Arginine and said second precursor solution has a pH of about 3.0 to 4.0; and
   wherein a mixture of the first precursor aqueous solution and the second precursor solution provides an organ and tissue preservation solution having a pH of about 7.3.

2. The kit of claim 1, wherein the first and second containers are first and second chambers within a single container and the first and second chambers are partitioned off from each other by a partition,
   wherein, upon removal of the partition, the first precursor aqueous solution mixes with the second precursor solution to form the organ and tissue preservation solution.

3. The kit of claim 1, wherein the pH of the first precursor aqueous solution is about 7.8 and the pH of the second precursor solution is about 3.0.

4. The kit of claim 1, wherein the pH of the first precursor aqueous solution is about 7.6 and the pH of the second precursor solution is about 4.0.

5. The kit of claim 1, wherein the first precursor aqueous solution and/or second precursor solution are formulated in a gel, ointment, lotion or hydrogel.

6. The kit of claim 1, wherein the sugar is glucose.

7. The kit of claim 6, wherein the organ and tissue preservation solution comprises the ascorbic acid in a concentration of about 25-1000 µM, the glutathione in a concentration of about 50-2000 µM, the L-arginine in a concentration of about 250-2000 µM, and the glucose in a concentration of about 50-120 mM.

8. The kit of claim 7, wherein the balanced salt solution comprises:
   calcium chloride dihydrate in a concentration of about 0.14 g/L;
   potassium chloride in a concentration of about 0.4 g/L;
   potassium phosphate monobasic in a concentration of about 0.06 g/L;
   magnesium chloride hexahydrate in a concentration of about 0.1 g/L;
   magnesium sulfate heptahydrate in a concentration of about 0.1 g/L
   sodium chloride in a concentration of about 8 g/L;
   sodium bicarbonate in a concentration of about 0.36 g/L; and
   sodium phosphate dibasic heptahydrate in a concentration of about 0.03 g/L.

9. The kit of claim 1, wherein the first precursor aqueous solution and the second precursor solution are provided in a volumetric ratio of 19:1, respectively.

* * * * *